US009413057B2

(12) United States Patent
Wong et al.

(10) Patent No.: US 9,413,057 B2
(45) Date of Patent: Aug. 9, 2016

(54) MOBILE WIRELESS COMMUNICATIONS DEVICE WITH AN INTEGRATED BATTERY/ANTENNA AND RELATED METHODS

(75) Inventors: Joshua Kwan Ho Wong, Waterloo (CA); John Alfred Whitmore, Heidelberg (CA); Ying Tong Man, Waterloo (CA)

(73) Assignee: BlackBerry Limited, Waterloo (CA)

( * ) Notice: Subject to any disclaimer, the term of this patent is extended or adjusted under 35 U.S.C. 154(b) by 551 days.

(21) Appl. No.: 12/904,385

(22) Filed: Oct. 14, 2010

(65) Prior Publication Data

US 2011/0275421 A1 Nov. 10, 2011

Related U.S. Application Data

(60) Provisional application No. 61/331,994, filed on May 6, 2010.

(51) Int. Cl.

| | |
|---|---|
| ***H04B 1/38*** | (2015.01) |
| ***H01Q 1/24*** | (2006.01) |
| ***H01Q 1/22*** | (2006.01) |
| ***H01Q 1/44*** | (2006.01) |
| ***H01Q 7/00*** | (2006.01) |

(52) U.S. Cl.

CPC ............. *H01Q 1/243* (2013.01); *H01Q 1/2225* (2013.01); *H01Q 1/44* (2013.01); *H01Q 7/00* (2013.01)

(58) Field of Classification Search

CPC .......... G06K 7/10237; G06K 19/0723; G06K 19/0726; H04B 5/0081; H04B 1/1615; H01M 2/0272; H01M 2/0287; H02M 2/168; H04W 4/008

USPC ................................................ 455/41.1, 572

See application file for complete search history.

(56) References Cited

U.S. PATENT DOCUMENTS

| | | | | |
|---|---|---|---|---|
| 3,884,719 | A * | 5/1975 | Evans et al. | 429/112 |
| 6,597,320 | B2 | 7/2003 | Maeda et al. | 343/718 |
| 6,700,491 | B2 | 3/2004 | Shafer | 340/572.7 |
| 7,202,825 | B2 | 4/2007 | Leizerovich et al. | 343/702 |
| 7,333,062 | B2 | 2/2008 | Leizerovich et al. | 343/702 |
| 2004/0146777 | A1 | 7/2004 | Forlino et al. | 429/122 |
| 2004/0251872 | A1* | 12/2004 | Wang et al. | 320/112 |
| 2005/0134213 | A1* | 6/2005 | Takagi et al. | 320/108 |
| 2006/0145660 | A1* | 7/2006 | Black et al. | 320/108 |
| 2006/0240290 | A1* | 10/2006 | Holman et al. | 429/3 |
| 2007/0057851 | A1 | 3/2007 | Leizerovich et al. | 343/702 |
| 2007/0155443 | A1 | 7/2007 | Cheon et al. | 455/572 |
| 2008/0090520 | A1* | 4/2008 | Camp et al. | 455/41.2 |
| 2008/0194200 | A1* | 8/2008 | Keen et al. | 455/41.1 |

(Continued)

FOREIGN PATENT DOCUMENTS

| | | | |
|---|---|---|---|
| DE | 19824145 | 12/1999 | H01Q 1/24 |
| WO | 00/79771 | 12/2000 | H04M 1/02 |

*Primary Examiner* — Charles Appiah
*Assistant Examiner* — Edward Zhang
(74) *Attorney, Agent, or Firm* — Guntin & Gust, PLC; Ralph Trementozzi

(57) ABSTRACT

A mobile wireless communications device may include a portable housing, a cellular transceiver carried by the portable housing, and a battery carried by the portable housing and comprising a pair of electrodes and an electrolyte therebetween. The mobile wireless communications device may further include a wireless communications circuit carried by the portable housing and configured to wirelessly communicate via at least one of the electrodes.

19 Claims, 21 Drawing Sheets

| S21 (dB) @ 13 MHz | | EXPERIMENT SETUP |
|---|---|---|
| MEASURED | DELTA (BATTERY-COIL) | |
| -24.2 | 37.4 |  |

(56) References Cited

U.S. PATENT DOCUMENTS

2008/0238803 A1* 10/2008 Yang et al. .................... 343/848
2009/0224057 A1 9/2009 Chen et al. .................... 235/492
2009/0256766 A1* 10/2009 Bury ............................ 343/767
2009/0278494 A1* 11/2009 Randall ........................ 320/114
2011/0136430 A1* 6/2011 Konya .......................... 455/41.1
2012/0028134 A1* 2/2012 Kim ...................... H01M 4/364
429/342
2012/0270499 A1* 10/2012 Wilson ......................... 455/41.1

* cited by examiner

| S21 (dB) @ 13 MHz | | EXPERIMENT SETUP |
|---|---|---|
| MEASURED | DELTA (BATTERY-COIL) | |
| -24.2 | 37.4 |  |

| S21 (dB) @ 13 MHz | | EXPERIMENT SETUP |
|---|---|---|
| MEASURED | DELTA (BATTERY-COIL) | |
| -4.1 | 15 |   |

| S21 (dB) @ 13 MHz | | EXPERIMENT SETUP |
| --- | --- | --- |
| MEASURED | DELTA (BATTERY-COIL) | |
| -24.7 | 31 |  |

MOBILE WIRELESS COMMUNICATIONS DEVICE WITH AN INTEGRATED BATTERY/ANTENNA AND RELATED METHODS

CROSS-REFERENCE TO RELATED APPLICATIONS

This application is based upon prior filed provisional application Ser. No. 61/331,994 filed May 6, 2010, the disclosure of which is incorporated herein by reference in its entirety.

TECHNICAL FIELD

The present disclosure generally relates to the field of wireless communications systems, and, more particularly, to mobile wireless communications devices and related methods.

BACKGROUND

Mobile wireless communications systems continue to grow in popularity and have become an integral part of both personal and business communications. For example, cellular telephones allow users to place and receive voice calls most anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Some mobile devices also incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range wireless communications technology exchanges data between devices over a short distance, such as only a few centimeters.

DETAILED DESCRIPTION

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in alternative embodiments.

Generally speaking, a mobile wireless communications device is provided herein which may include a portable housing, a cellular transceiver carried by the portable housing, and a battery carried by the portable housing and comprising a pair of electrodes and an electrolyte therebetween. The mobile wireless communications device may further include a wireless communications circuit carried by the portable housing and configured to wirelessly communicate via at least one of the pair of electrodes. Thus, the electrode(s) of the battery also serves as an antenna for the wireless communication circuit, which may advantageously avoid the need for a separate antenna within the device, and therefore conserves space.

More particularly, the wireless communications circuit may be configured to operate via magnetic field induction. By way of example, the wireless communications circuit may comprise a Near Field Communication (NFC) circuit configured to send and receive NFC signals via at least one of the pair of electrodes The wireless communications circuit may also comprise a frequency modulation (FM) circuit configured to receive FM signals via at least one of the pair of electrodes.

In one exemplary embodiment, the pair of electrodes and electrolyte may be arranged in a layered stack. Moreover, the layered stack may have at least one fold therein. The mobile wireless communications device may further include at least one tertiary coil adjacent the battery. By way of example, the battery may be positioned within the at least one tertiary coil. Additionally, the mobile wireless communications device may further include a cellular antenna carried by the portable housing and coupled to the cellular transceiver.

A related method is provided for making a mobile wireless communications device. The method may include coupling a cellular transceiver, a battery, and a wireless communications circuit to a portable housing, where the battery comprises a pair of electrodes and an electrolyte therebetween. The method may further include configuring the wireless communications circuit to wirelessly communicate via at least one of the pair of electrodes.

Figure 1:
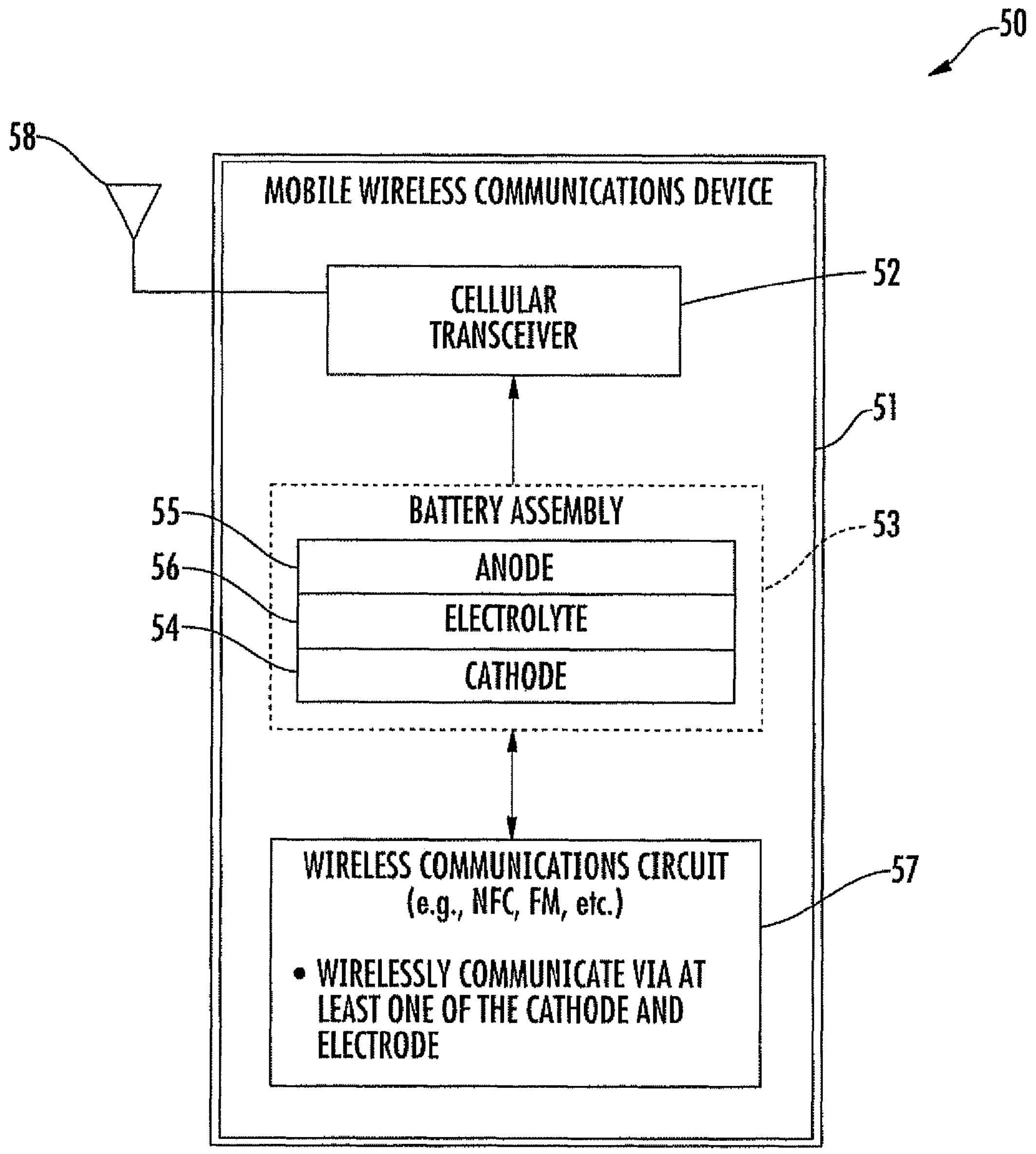
FIG. 1 is a schematic block diagram of a mobile wireless communications device in accordance with an exemplary embodiment including an integrated battery/antenna assembly.

Referring initially to FIG. 1, a mobile wireless communications device 50 (also referred to as a "mobile device" herein) illustratively includes a portable housing 51, a cellular transceiver 52 carried by the portable housing, and a battery assembly 53 carried by the portable housing and including a pair of electrodes (namely a cathode 54 and an anode 55) and an electrolyte 56 therebetween. The mobile device 50 further illustratively includes a wireless communications circuit 57 carried by the portable housing 51 and configured to wirelessly communicate via at least one of the cathode 54 and anode 55. That is, the battery 53 also functions or doubles as an antenna for the wireless communications circuit 57, to advantageously conserve scarce space or "real estate" within the mobile device 50, as will be discussed further below. One or more cellular antennas 58 (e.g., internal or external antennas) may also be carried by the portable housing 51 and coupled to the cellular transceiver 52.

Figure 16:
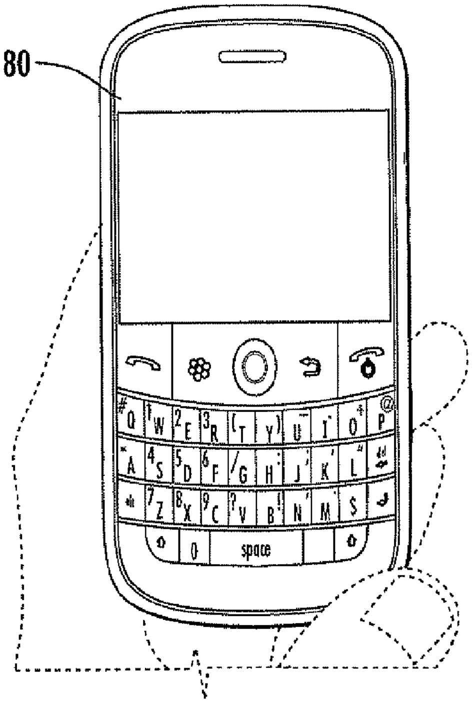
FIGS. 16 and 17 are front and rear views, respectively, of a mobile wireless communications device in accordance with an alternative embodiment in which the integrated battery/antenna assembly is used as a frequency modulation (FM) antenna.
Figure 17:
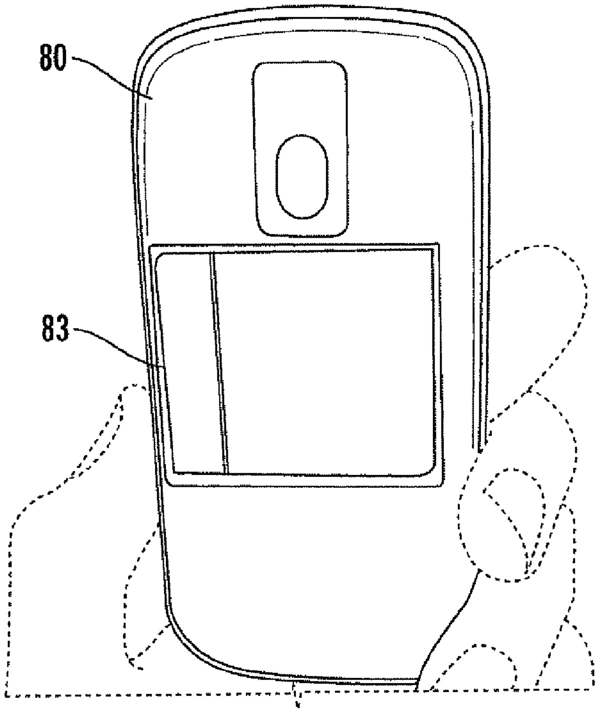

By way of example, the wireless communications circuit 57 may be configured to operate via magnetic field induction, such as an NFC circuit which generates a magnetic field in an active mode to send and receive NFC signals using one or both of the cathode 54 and anode 55. In accordance with another example, the wireless communications circuit 57 may comprise a frequency modulation (FM) circuit configured to receive FM signals via one or both of the cathode 54 and anode 55. In some embodiments, the battery 50 may function as both RFID (e.g., NFC) and RF (e.g., FM) antennas. An exemplary mobile device 80 in which the battery 83 is used as an FM antenna is shown in FIGS. 16 and 17.

Accordingly, the battery 53 advantageously provides an integrated low frequency (e.g., Near Field Communication (NFC)) antenna and battery module which may advantageously provide over a 10 dB peak gain improvement when compared to a conventional NFC coil implementation, while also helping to maintain desired hearing aid compatibility (HAC) performance.

By way of background, NFC poses an integration challenge to mobile device designers because of its relatively low frequency of operation (13 MHz), as compared to cellular frequency bands. As a result of the low operating frequency, the physical size of NFC antennas required to achieve such frequencies may be as large as that of the entire mobile device itself in some cases. Furthermore, NFC antennas are often required to co-exist with other antennas in a phone, such as the main (e.g., cellular) antenna(s), WiFi, BlueTooth, GPS, radio (e.g., frequency modulation (FM)), etc.

Some mobile device NFC implementations make use of large coils to form a loop antenna. In this way, NFC communication between multiple NFC-enabled devices is achieved by virtue of the magnetic fields coupled between the coil in one device to the coil in the other device. Such an implementation usually requires a large loop area, and it also requires the coil to be placed over a ferrite substrate to avoid "shorting" out the antenna. More specifically, the ferrite serves to increase the electrical length between the loop and the surrounding metallic structure and avoid a situation in which the image currents are out of phase with the loop currents. Furthermore, such implementations do not allow the antenna to be shared for different operating formats or frequencies, such as between the NFC and the FM radio circuits, for example.

Figure 2:
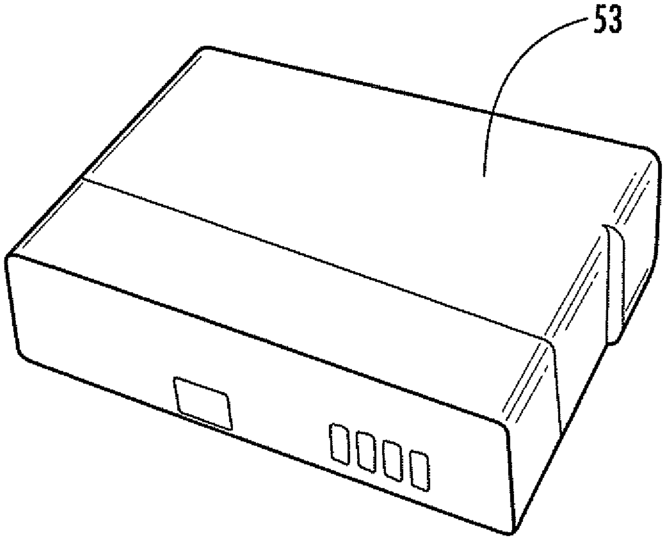
FIG. 2 is a perspective view of an exemplary integrated battery/antenna for use with the mobile wireless communications device of FIG. 1.
Figure 3:
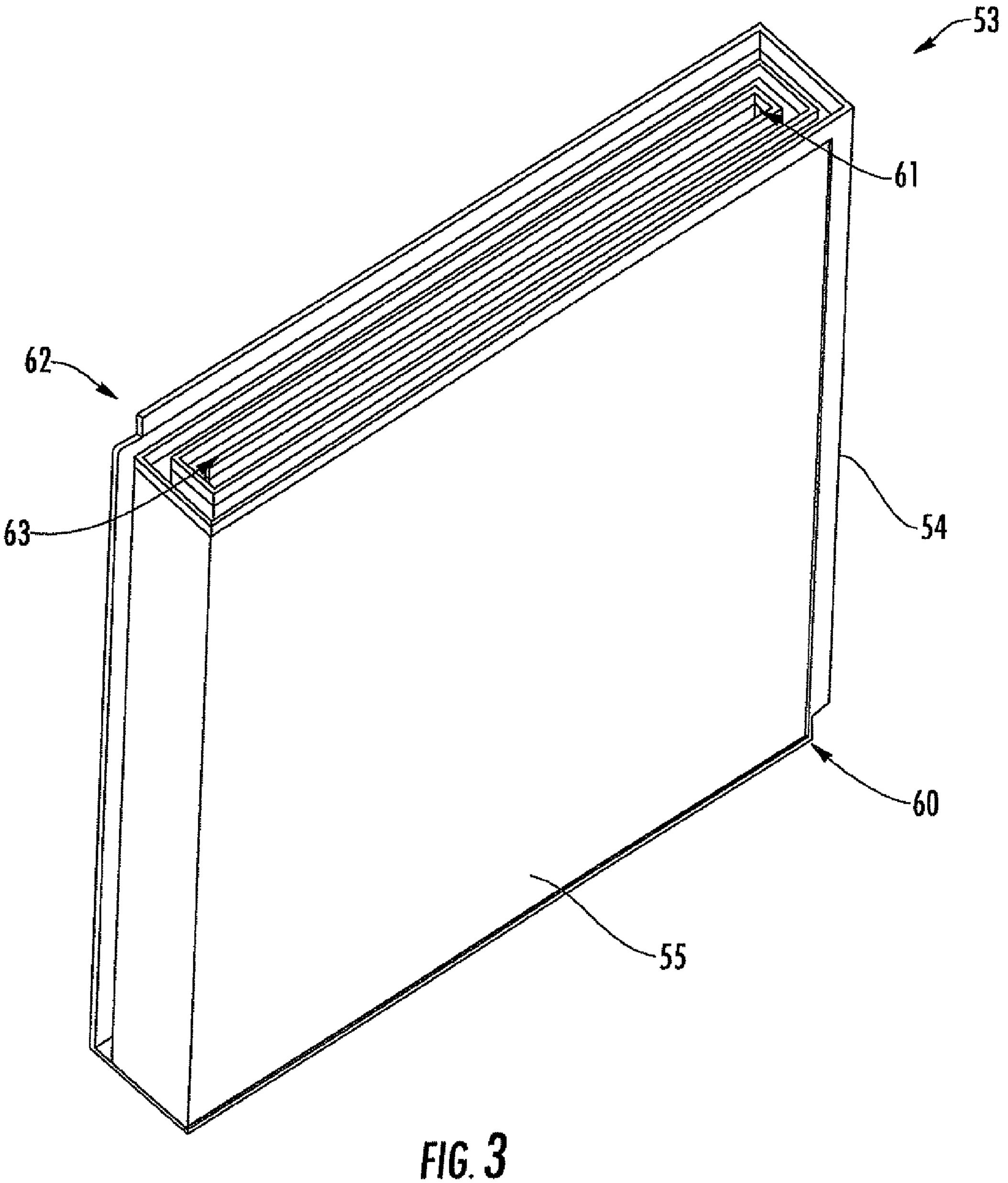
FIG. 3 is a schematic perspective view of a coiled battery stack for use in the integrated battery/antenna of FIG. 2.

An exemplary implementation of the battery 53 is shown in FIGS. 2 and 3. A typical lithium ion battery includes a cathode sheet 54 and an anode sheet 55 separated by an insulator sheet (not shown in FIG. 3 for clarity of illustration). The battery 53 illustrated in FIG. 3 includes a first port with first and second terminals 60, 61, and a second port with first and second terminals 62, 63. The sheet bundle or stack is rolled or folded into a shape specified by the mobile device manufacturer for the given implementation. The specific arrangement shown in FIG. 3 depicts two sheets intertwined with each other. In transformer terminology, this is known as an Frlan transformer.

Applicants have observed that from an electromagnetic perspective, the relatively long roll of sheets behaves like a loop antenna. That is, from an electromagnetic perspective, the battery 53 may be used as an antenna "as is" without any modifications, although the battery size/stack length may be selected to provide desired power and antenna characteristics in different embodiments. These characteristics are demonstrated by near field measurements of an experimental mobile device configuration, which will be discussed further below with reference to FIGS. 4-15.

The exemplary implementation has an advantage over conventional loop designs in that it combines two of the largest components in a mobile device, i.e., the battery and NFC antenna, so that they occupy the same volume or space. Since the NFC antenna is implemented as a part of the battery 53 and there is not a separate NFC (or FM in some embodiments) antenna coil, this also helps minimize any impact on HAC performance.

Figure 4:
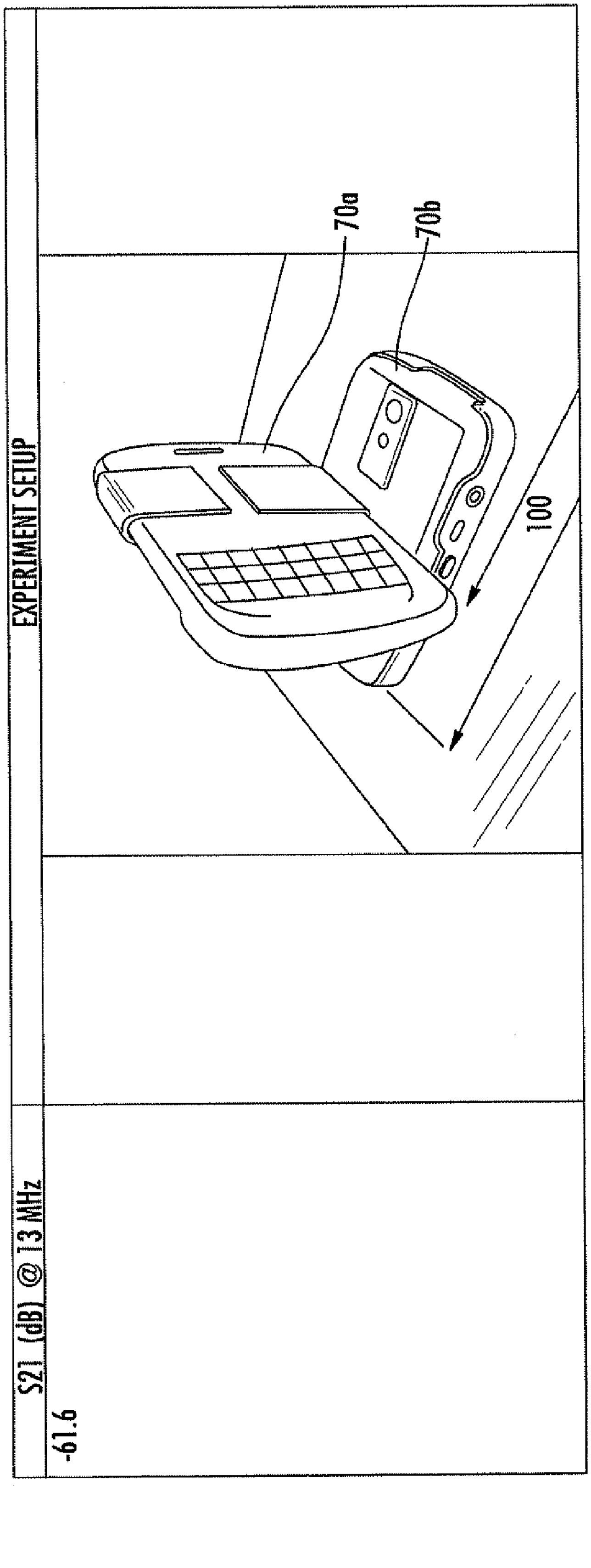
FIGS. 4-6 are perspective views of different NFC-enabled mobile wireless communications device test configurations in which the mobile wireless communications devices have separate conventional NFC loop antennas, along with corresponding free-space S21 test measurements therefor.
Figure 5:
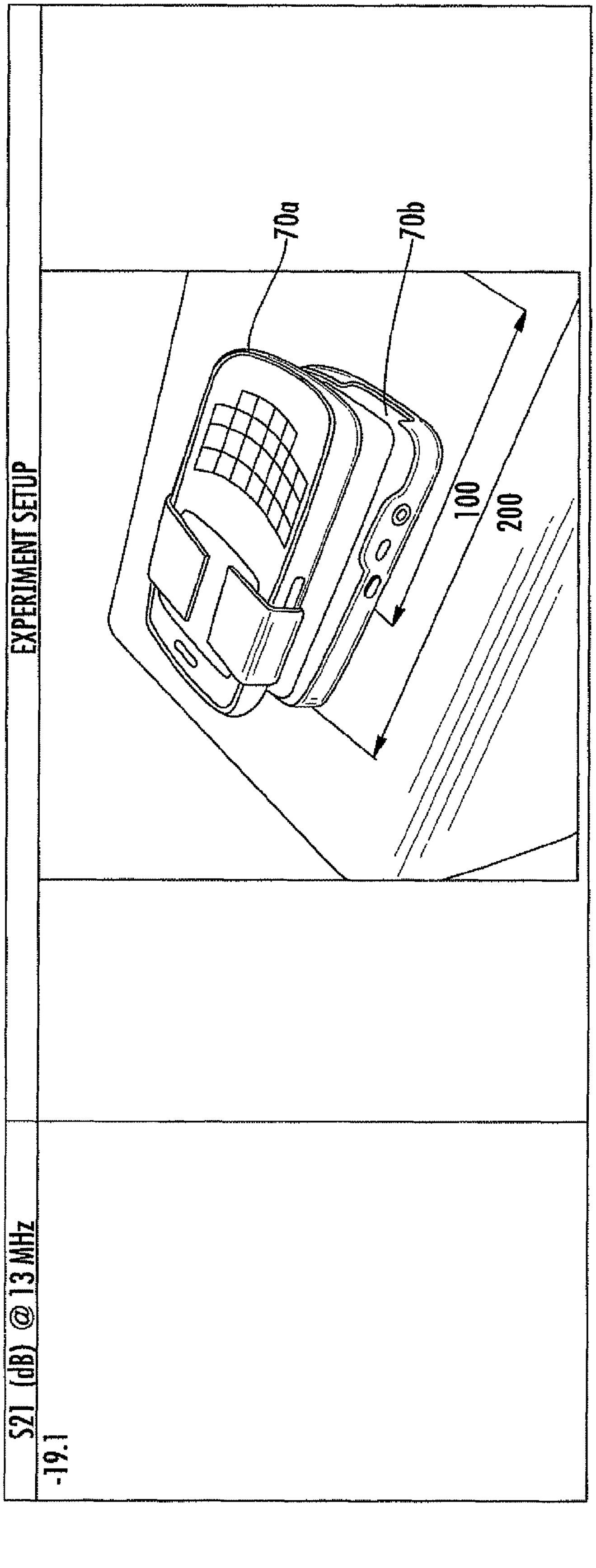
Figure 6:
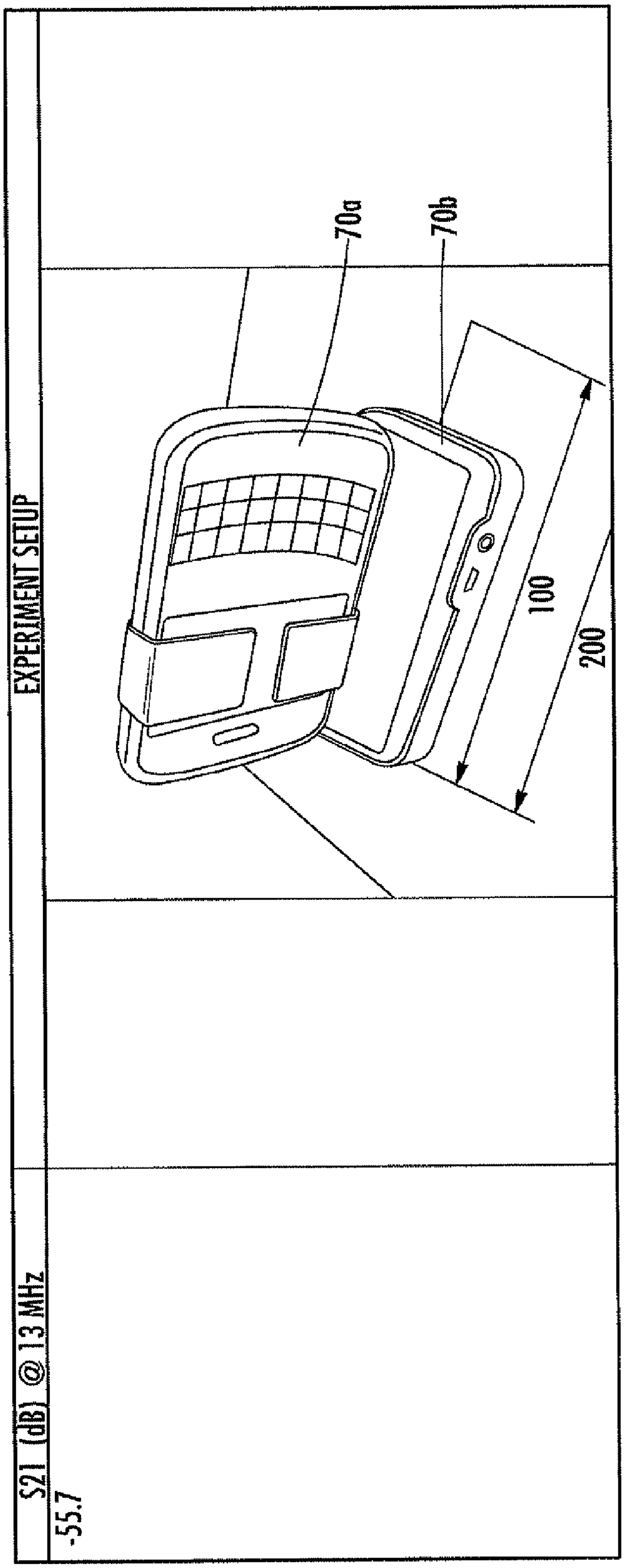
Figure 7:
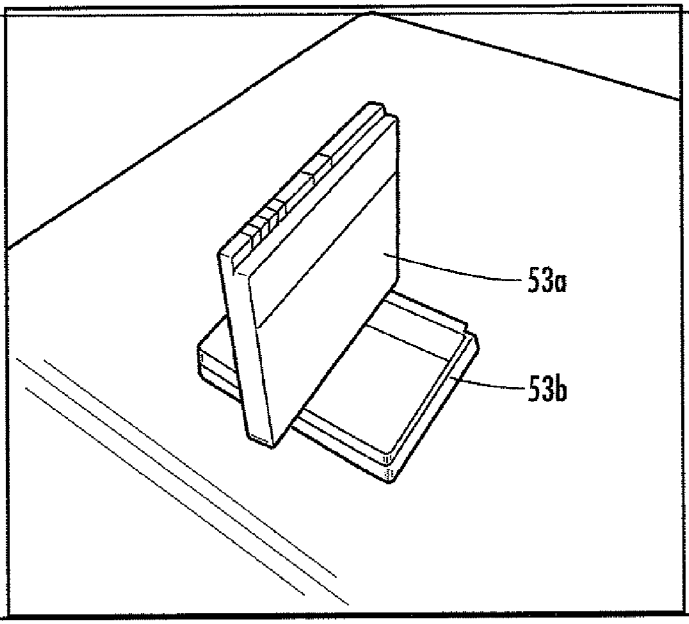
FIGS. 7-9 are perspective views of different integrated battery/antenna configurations in accordance with an exemplary implementation, along with corresponding free-space S21 test measurements therefor.
Figure 8:
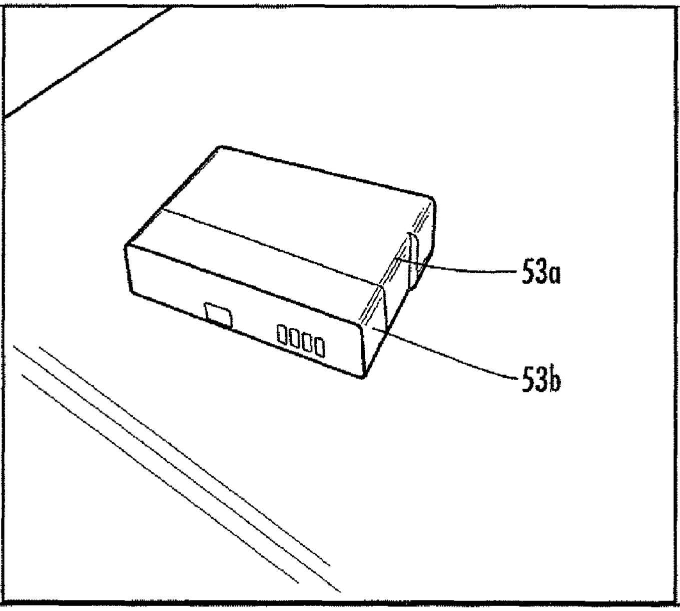
Figure 9:
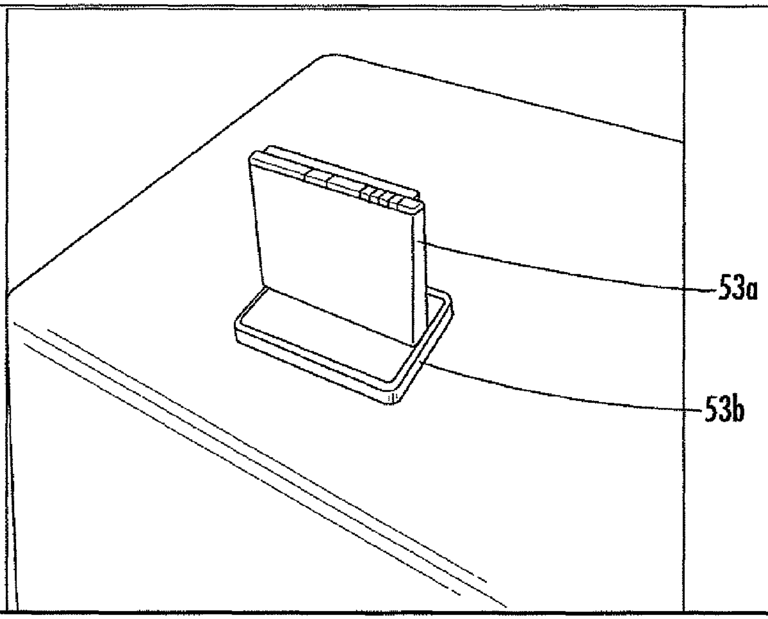
Figure 10:
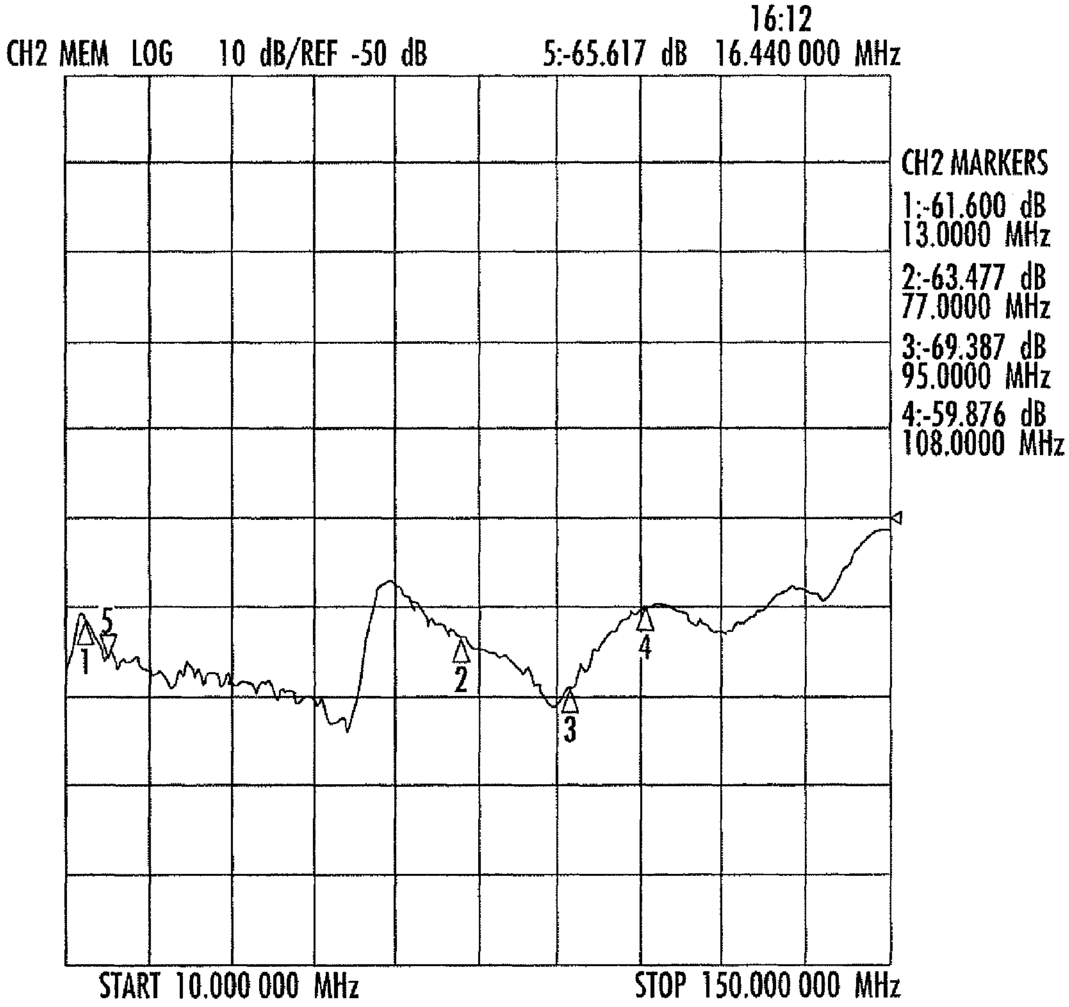
FIGS. 10-12 and 13-15 are frequency plots showing detailed measurement data for the test configurations of FIGS. 4-6 and 7-9, respectively.
Figure 11:
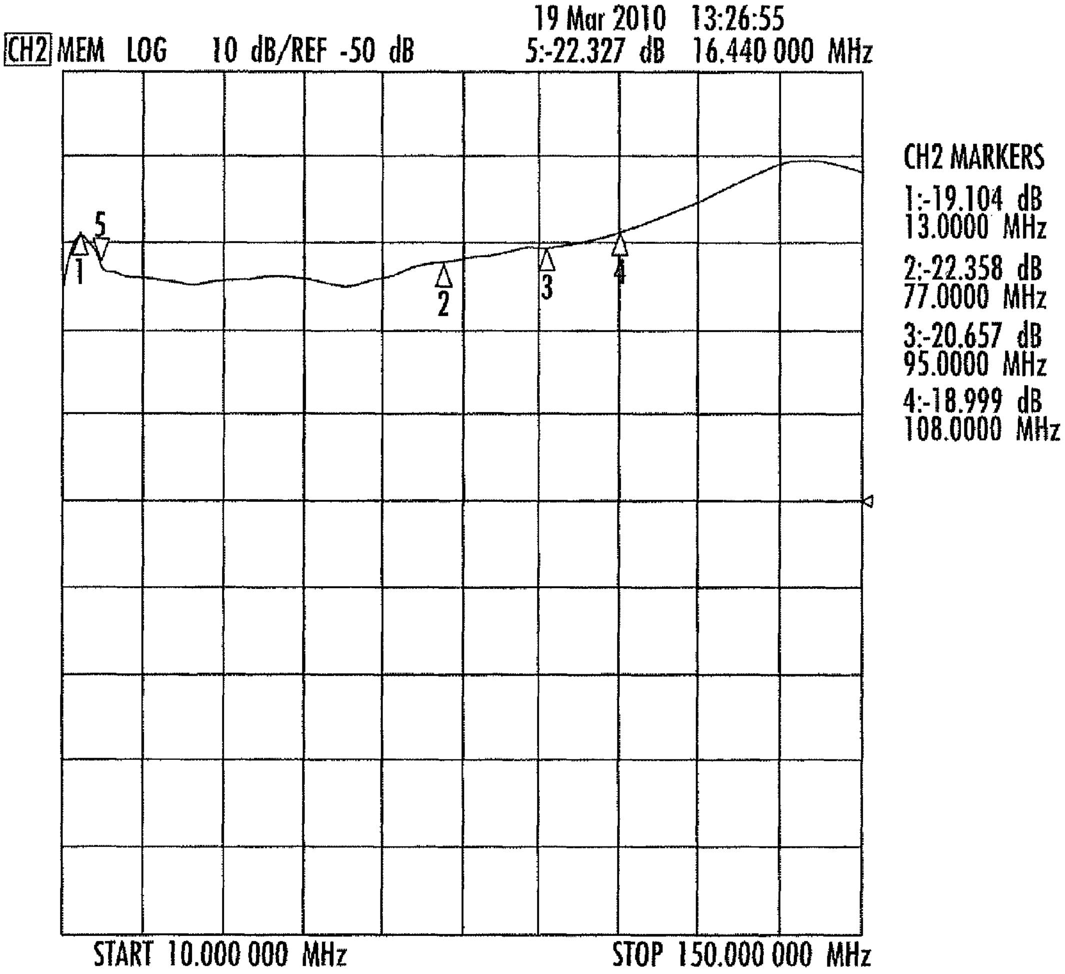
Figure 12:
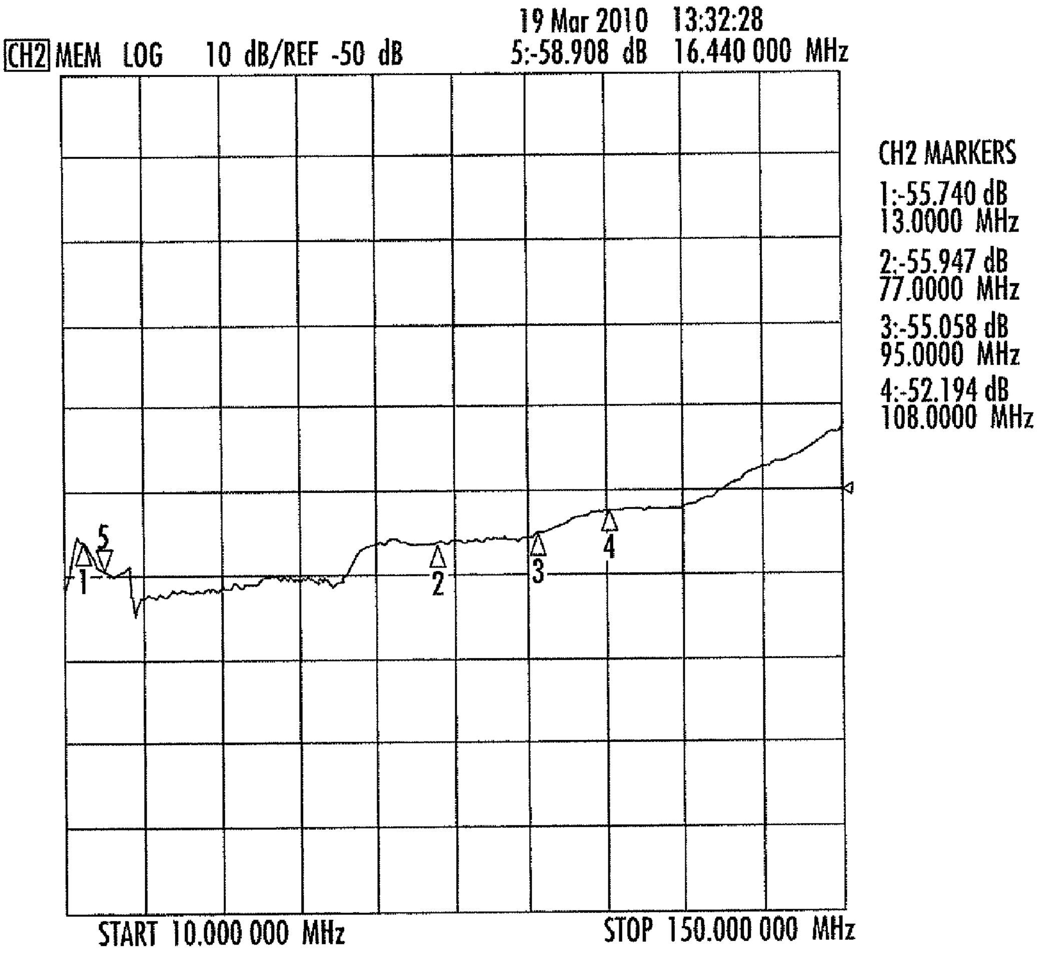
Figure 13:
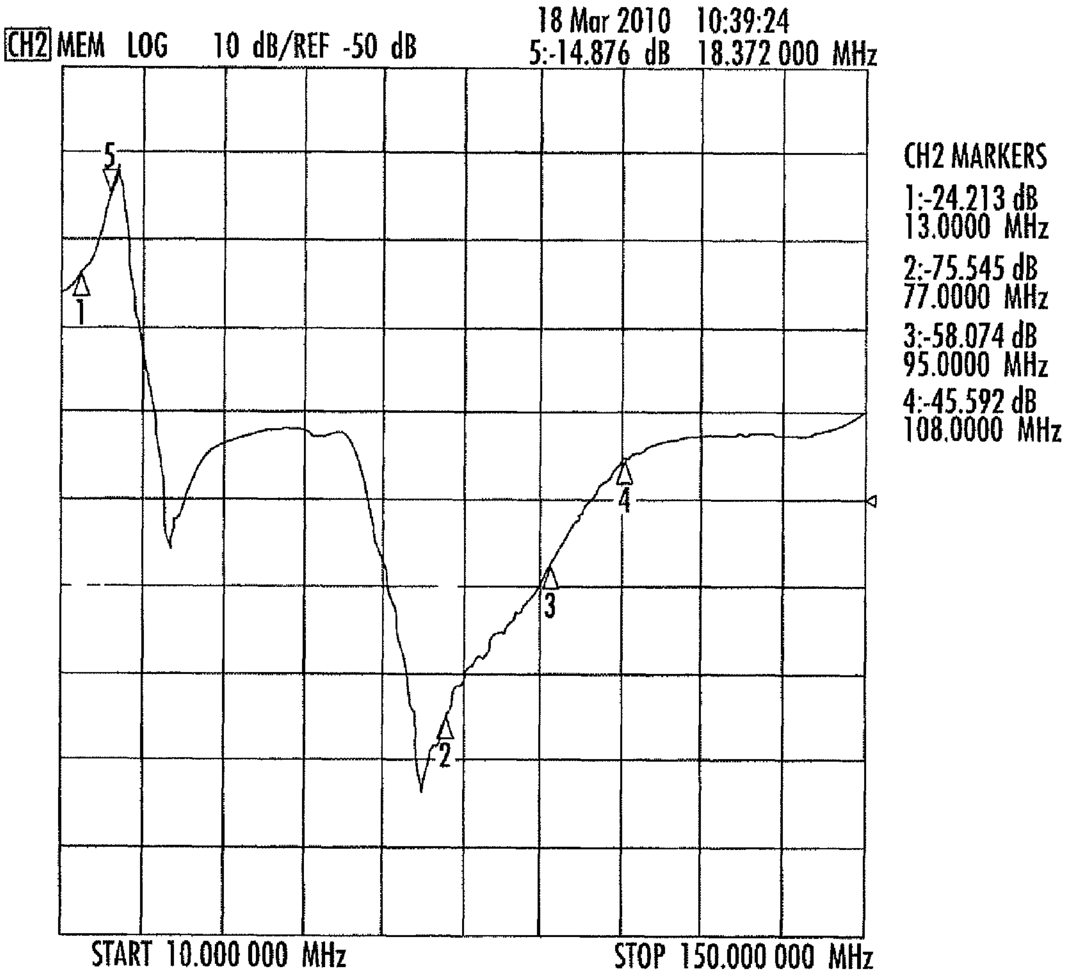
Figure 14:
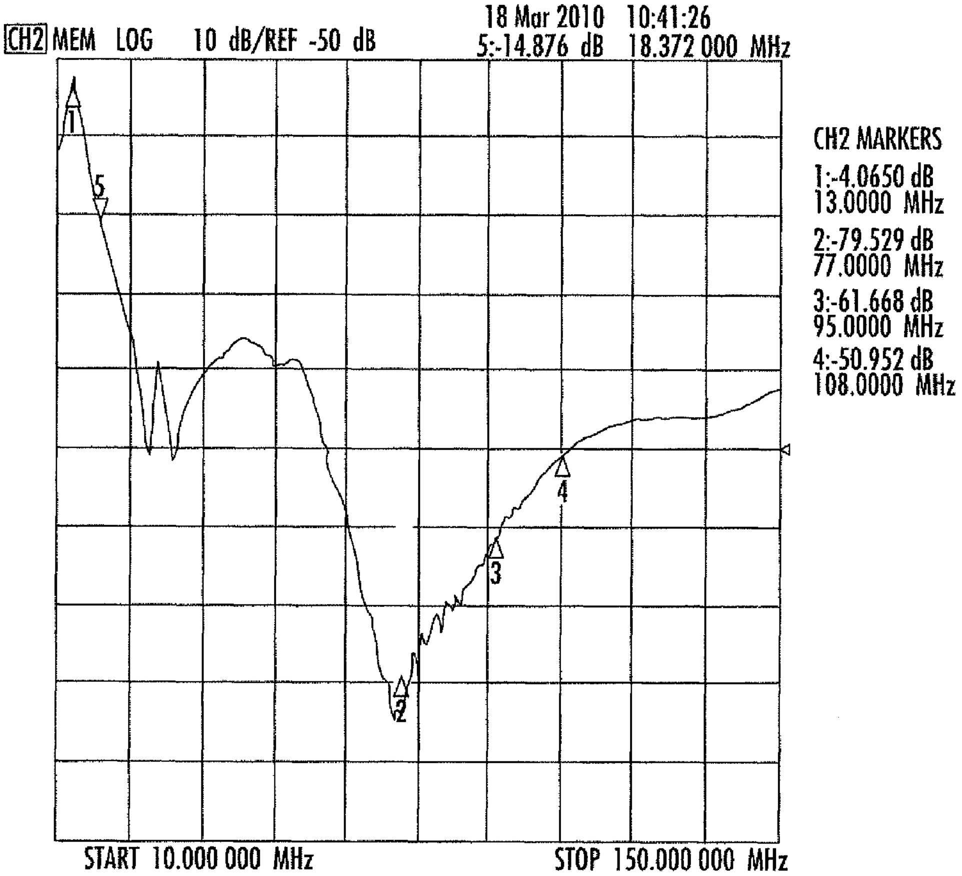
Figure 15:
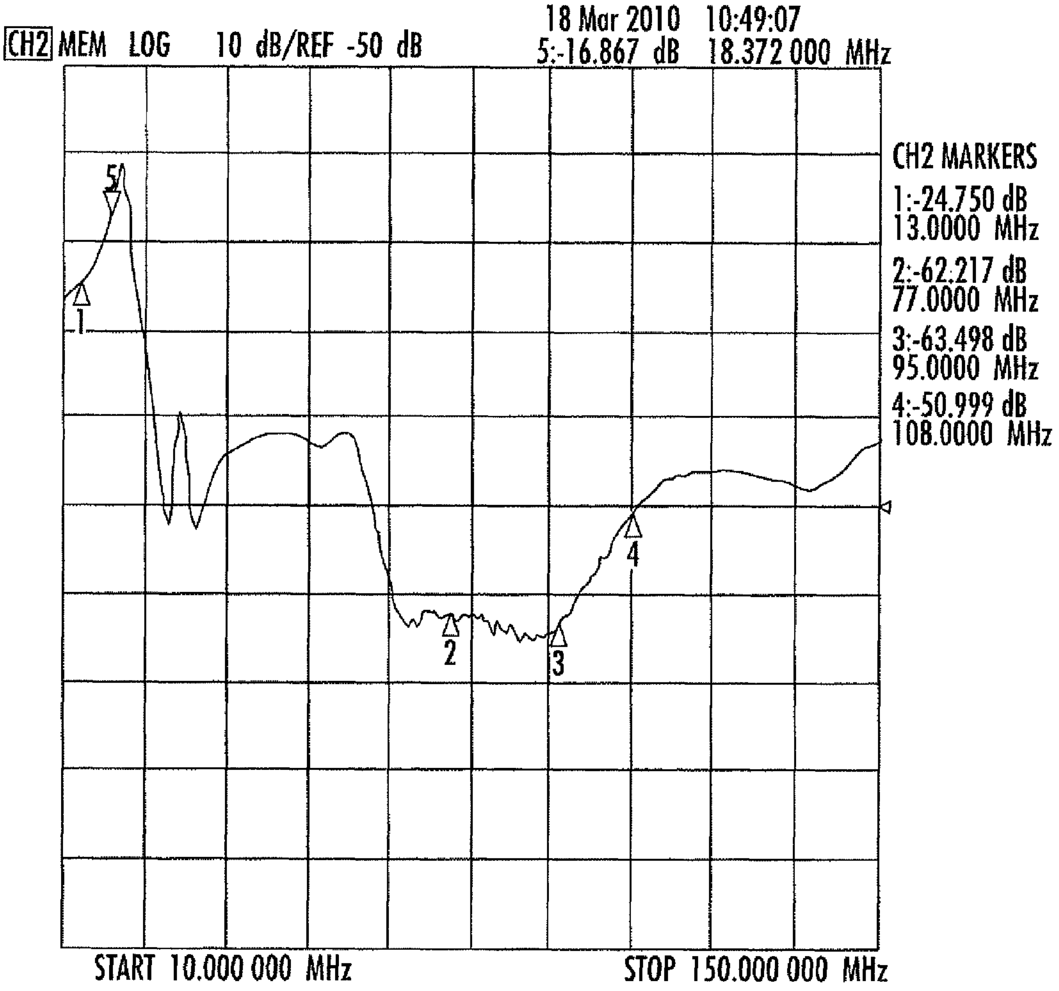

To validate the above-described operational characteristics, a series of experiments were performed between two conventional NFC-enabled mobile devices, and then the batteries by themselves as NFC antennas. The baseline results and respective test configurations for two NFC-enabled mobile device 70*a*, 70*b* with a separate NFC loop antenna are shown in FIGS. 4-6, while the corresponding results using just the batteries 73*a*, 73*b* from the devices as the NFC antennas (i.e., instead of the separate loop coils) are shown in FIGS. 7-9. In FIG. 4, the mobile device 70*a* is laterally orthogonal to and on top of the mobile device 70*b*, in FIG. 5 the mobile devices are laid flat and back-to-back, and in FIG. 6 the mobile device 70*a* is vertically orthogonal to and on top of the mobile device 70*b* as shown. The positions of the batteries 73*a*, 73*b* in FIGS. 7-9 are the same as the mobile devices 70*a*, 70*b* in FIGS. 4-6, respectively.

The performance is quantified by measuring the free-space S21 (in dB) defined from the terminals of one antenna to the other. FIGS. 10-12 and 13-15 are frequency plots showing detailed measurement data for the test configurations of FIGS. 4-6 and 7-9, respectively.

One observation from the testing is that a practical consideration of an integrated battery/antenna is that the radiated performance depends upon the particular battery cell. Furthermore, the battery terminals are connected to both the power system and the radio (i.e., whether an NFC or FM configuration). RF choking of the power system would therefore typically not be used, since the battery directly powers the mobile device power amplifier(s). As a result, there could be a degradation in power amplifier efficiency during transmission caused by voltage spikes developing across chokes, for example, in some configurations, although chokes may still potentially be used in other configurations.

Figure 18:
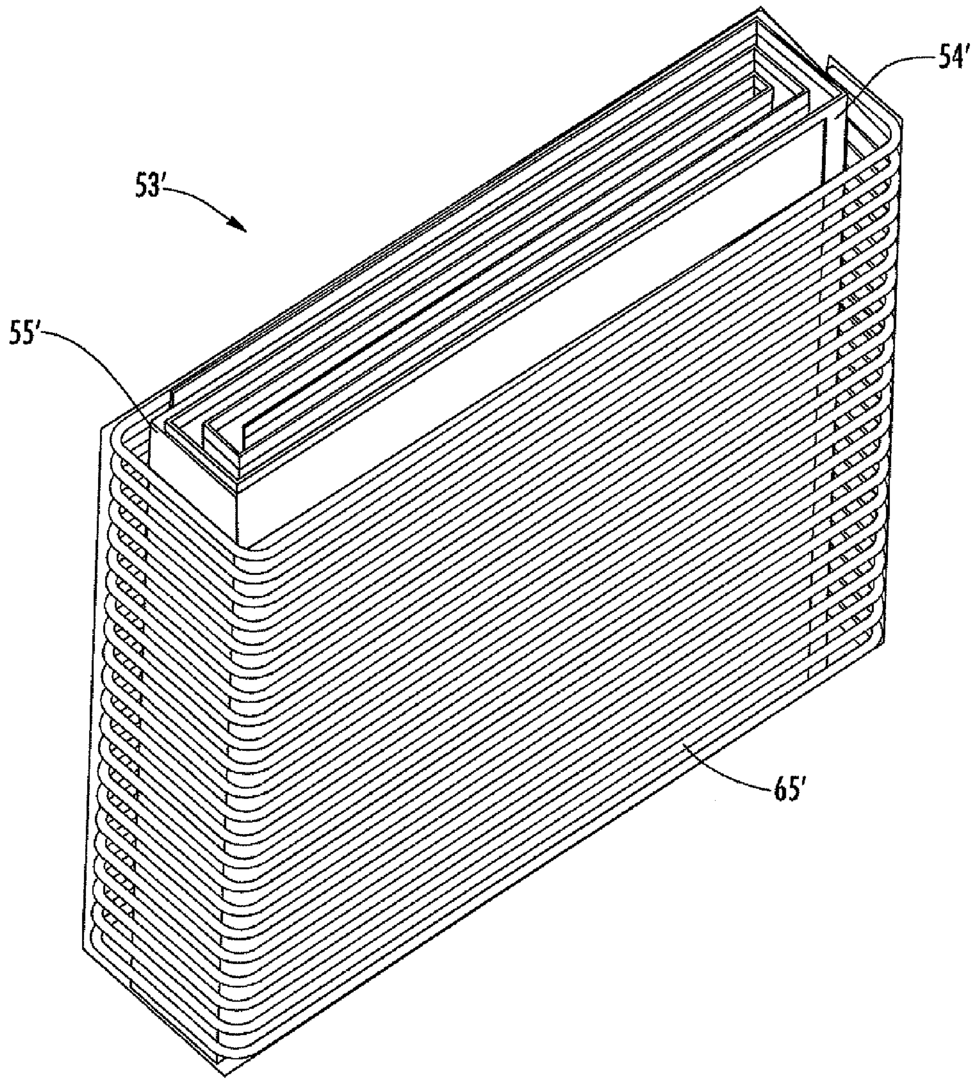
FIG. 18 is a schematic perspective view of an alternative embodiment of the integrated battery/antenna of FIG. 3 including a tertiary coil.
Figure 19:
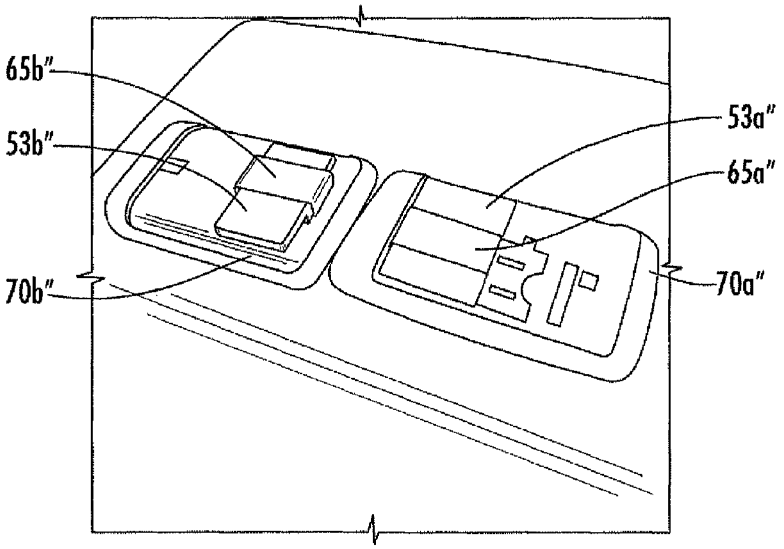
FIGS. 19, 21, and 23 are perspective views of test configurations for mobile wireless communications devices including integrated batteries/antennas with a tertiary coil.
Figure 20:
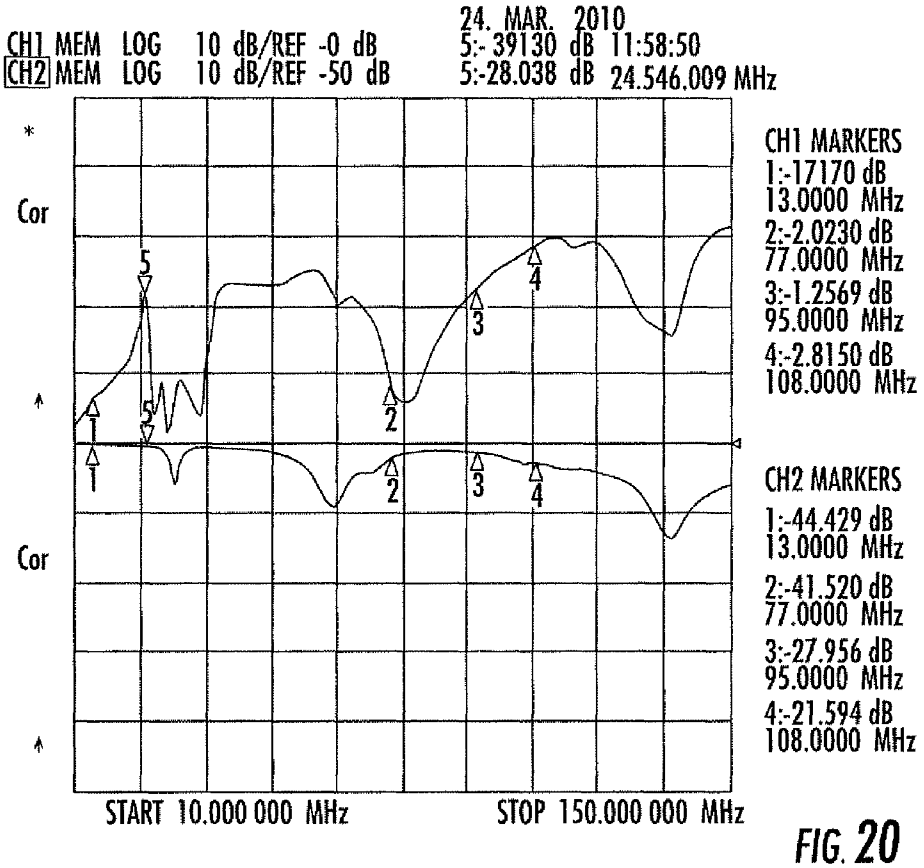
FIGS. 20, 22, and 24 are respective frequency plots showing detailed measurement data therefor.
Figure 21:
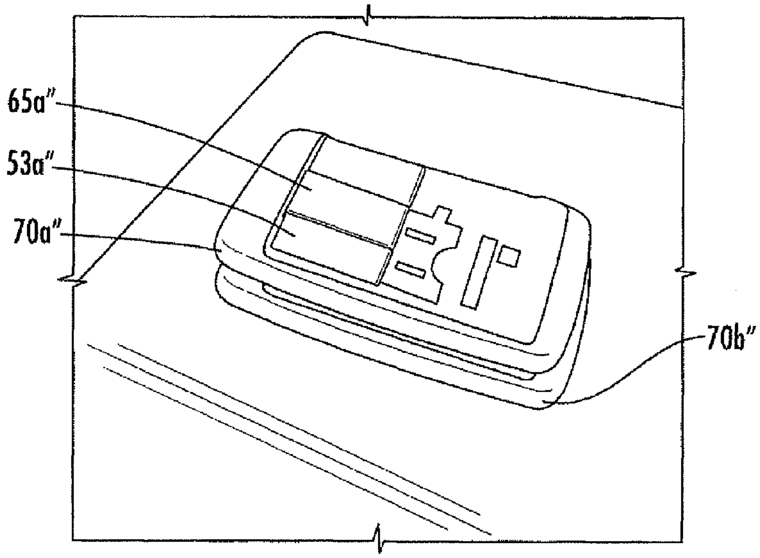
Figure 22:
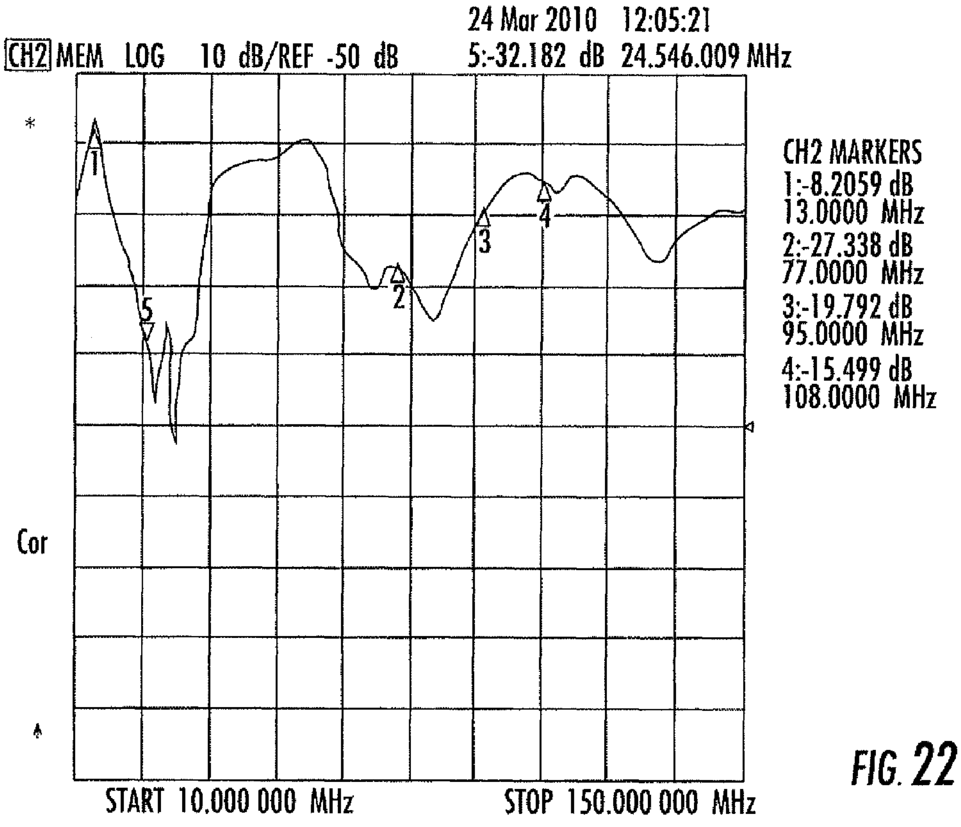
Figure 23:
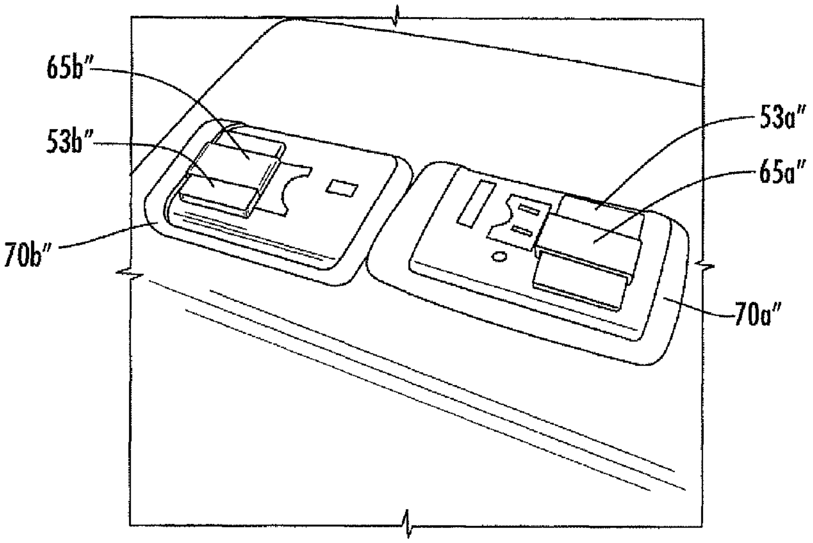
Figure 24:
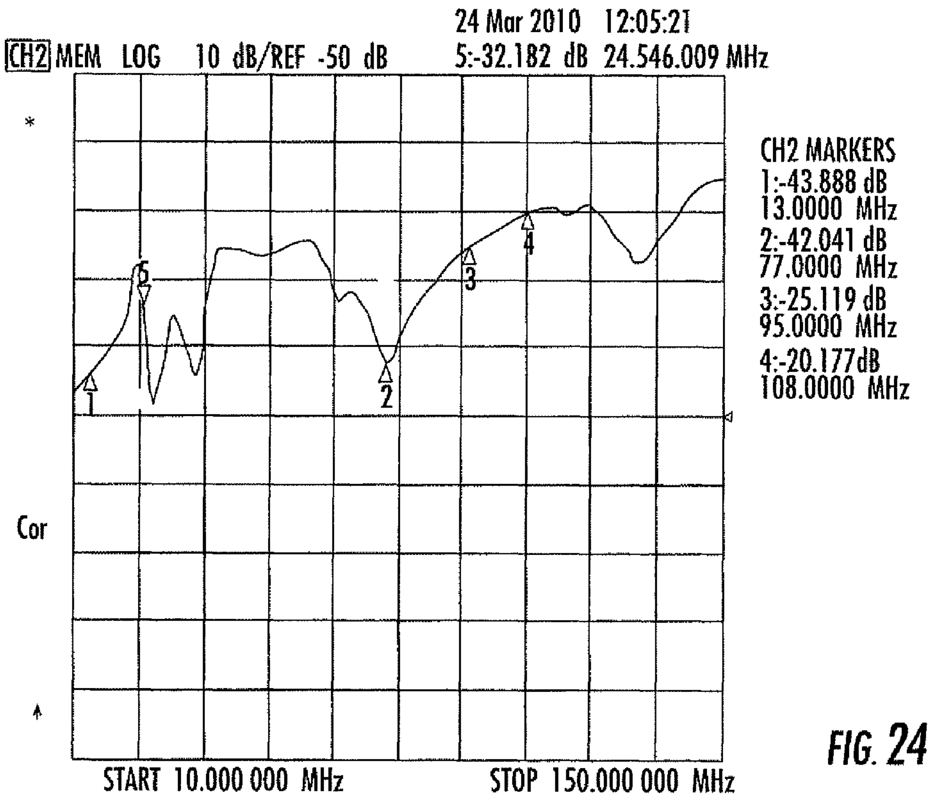
Figure 25:
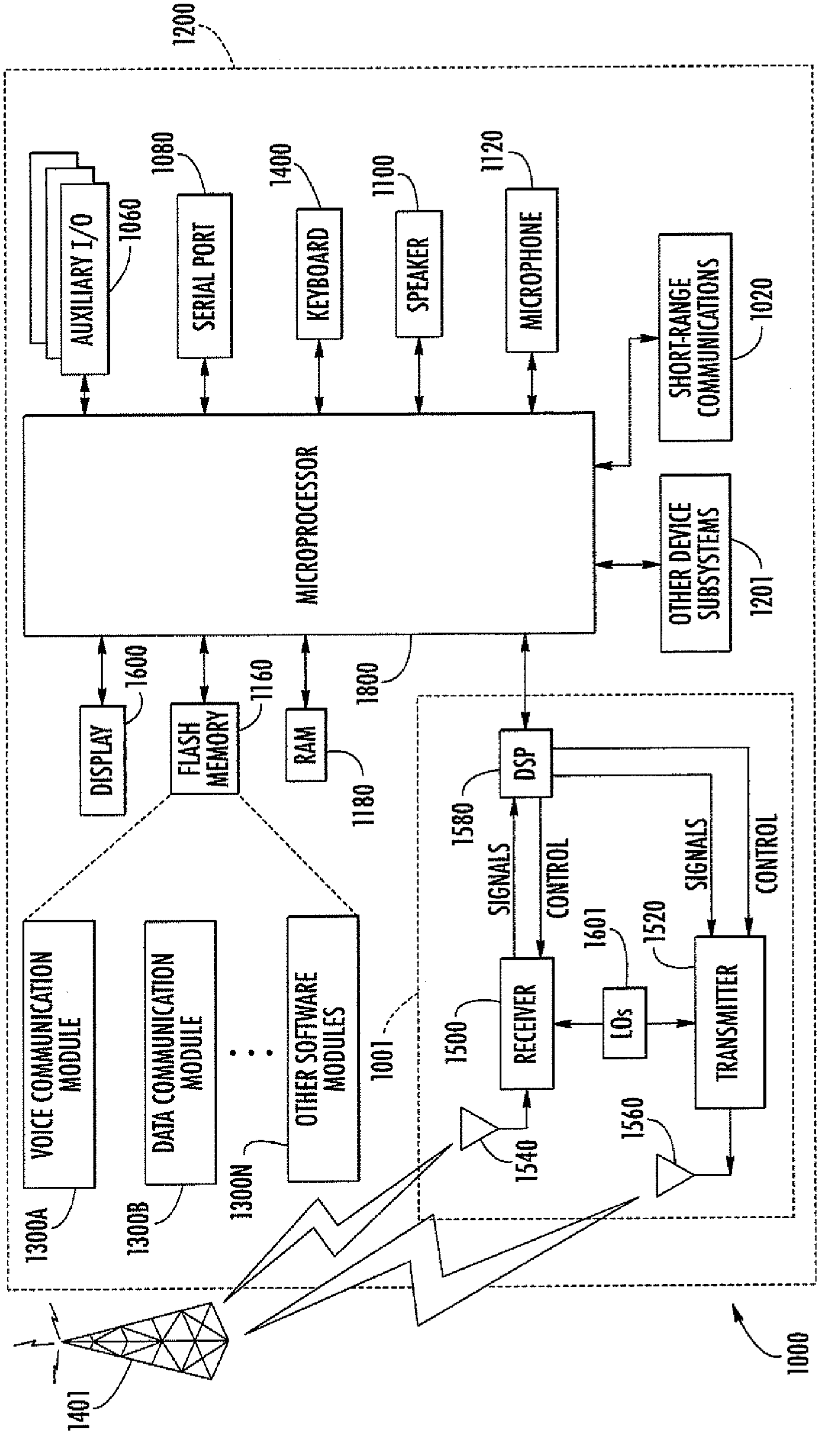
FIG. 25 is a schematic block diagram illustrating additional components that may be included in the exemplary mobile wireless communications devices.

Referring additionally to FIG. 18, one approach to integration of the battery/antenna 53' with other mobile device components is to introduce a tertiary coil 65'. The tertiary coil 65' is wrapped around the battery 53' in a vertical direction in the illustrated embodiment. This extra coil allows the low frequency circuits to be DC decoupled from the power system. A prototype construction with a laterally wrapped tertiary coil is shown in FIG. 19, in which mobile devices 70*a*", 70*b*" with respective batteries 53*a*", 53*b*" and tertiary coils 65*a*", 65*b*" are arranged bottom-to-bottom and face down as shown. The corresponding frequency plot showing detailed measurement data for this configuration is provided in FIG. 20. A similar test configuration is shown in FIG. 21, in which the mobile devices 70*a*", 70*b*" were placed face down and vertically aligned one on top of the other. The corresponding frequency plot showing detailed measurement data for this configuration is provided in FIG. 22. Still another exemplary test configuration is shown in FIG. 23, in which the mobile devices 70*a*', 70*b*' are positioned top-to-top and face down, and the corresponding frequency plot showing detailed measurement data for this configuration is provided in FIG. 24.

Exemplary components that may be used in various embodiments of the above-described mobile wireless communications device are now described with reference to an exemplary mobile wireless communications device 1000 shown in FIG. 26. The device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures, for example). The keypad 1400 may include a mode selection key, or other hardware or software for switching between text entry and telephony entry.

In addition to the processing device 1800, other parts of the mobile device 1000 are shown schematically in FIG. 26. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications or modules 1300A-1300N on the device 1000, such as software modules for performing various steps or operations. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker

1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included.

That which is claimed is:

1. A mobile wireless communications device comprising:

a portable housing;

a cellular transceiver carried by the portable housing;

a cellular antenna carried by the portable housing and coupled to the cellular transceiver;

a coiled battery stack carried by the portable housing and comprising a pair of electrodes and an electrolyte therebetween being arranged in a layered stack having at least one fold therein, wherein the pair of electrodes are intertwined with each other, wherein the layered stack comprises a Frlan structure; and a wireless communications circuit comprising a Near Field Communication (NFC) circuit and carried by the portable housing and configured to generate a magnetic field to send and receive NFC signals using at least one of the pair of electrodes of the coiled battery stack as an antenna.

2. The mobile wireless communications device of claim 1 wherein the wireless communications circuit further comprises a frequency modulation (FM) circuit configured to receive FM signals using at least one of the electrodes as an antenna.

3. The mobile wireless communications device of claim 1 wherein each of the pair of electrodes is a single contiguous electrode having multiple folds therein to provide the layered stack.

4. The mobile wireless communications device of claim 1 further comprising at least one tertiary coil adjacent the coiled battery stack.

5. The mobile wireless communications device of claim 4 wherein the coiled battery stack is positioned within the at least one tertiary coil.

6. A mobile wireless communications device comprising:

a portable housing;

a cellular transceiver carried by the portable housing;

a cellular antenna carried by the portable housing and coupled to the cellular transceiver;

a coiled battery stack carried by the portable housing and comprising a pair of electrodes, including a cathode and an anode, and an electrolyte therebetween, the cathode, anode, and electrolyte being arranged in a layered stack having at least one fold therein, wherein the pair of electrodes are intertwined with each other;

a Near Field Communication (NFC) circuit carried by the portable housing and configured to generate a magnetic field to send and receive NFC signals using at least one of the pair of electrodes of the coiled battery stack as an antenna; and at least one tertiary coil adjacent the coiled battery stack, wherein the coiled battery stack is positioned within the at least one tertiary coil, and wherein the coiled battery stack is DC decoupled from the at least one tertiary coil.

7. The mobile wireless communications device of claim 6 wherein the layered stack has a plurality of folds therein.

8. A method of operating a mobile wireless communications device comprising a cellular transceiver, a cellular antenna coupled to the cellular transceiver, a coiled battery stack, and a wireless communications circuit within a portable housing, the coiled battery stack comprising a pair of electrodes and an electrolyte therebetween being arranged in a layered stack having at least one fold therein, wherein the pair of electrodes are intertwined with each other, wherein the layered stack comprises a Frlan structure, the method comprising:

using the wireless communications circuit to generate a magnetic field to send and receive Near Field Communication (NFC) signals using at least one of the electrodes of the coiled battery stack as an antenna.

9. The method of claim 8 wherein the wireless communications circuit further comprises a frequency modulation (FM) circuit configured to receive FM signals using at least one of the electrodes as an antenna.

10. The method of claim 8 wherein the layered stack has a plurality of folds therein.

11. The method of claim 8 further comprising using at least one tertiary coil adjacent to the coiled battery stack.

12. The method of claim 11 wherein the coiled battery stack is within the at least one tertiary coil.

13. The mobile wireless communications device of claim 1 wherein the layered stack comprises a plurality of folds.

14. The mobile wireless communications device of claim 1, wherein the layered stack has a plurality of folds therein, wherein a first terminal is coupled to an electrode of the pair of electrodes along an outer portion of the plurality of folds and a second terminal is coupled to the electrode along an inner portion of the plurality of folds.

15. The mobile wireless communications device of claim 5 wherein the coiled battery stack is DC decoupled from the at least one tertiary coil.

16. The mobile wireless communications device of claim 6, wherein the layered stack comprises a Frlan transformer.

17. The method of claim 8 further comprising at least one tertiary coil adjacent the coiled battery stack.

18. The method of claim 17 wherein the coiled battery stack is positioned within the at least one tertiary coil.

19. The method of claim 18 wherein the coiled battery stack is DC decoupled from the at least one tertiary coil.

* * * * *